United States Patent
Guillaume et al.

(10) Patent No.: US 7,803,266 B2
(45) Date of Patent: Sep. 28, 2010

(54) DOPED SPHERICALLY-SHAPED SUPPORTED CATALYST AND PROCESS FOR HYDROTREATING AND HYDROCONVERTING METAL-CONTAINING OIL FRACTIONS

(75) Inventors: Denis Guillaume, Vienne (FR); Stéphane Kressmann, Serezin du Rhone (FR); Magalie Roy-Auberger, Bourgoin Jallieu (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 688 days.

(21) Appl. No.: 11/086,556

(22) Filed: Mar. 23, 2005

(65) Prior Publication Data
US 2005/0211603 A1 Sep. 29, 2005

(30) Foreign Application Priority Data
Mar. 23, 2004 (FR) .................................. 04 02980

(51) Int. Cl.
| C10G 11/00 | (2006.01) |
| C10G 45/04 | (2006.01) |
| C10G 45/08 | (2006.01) |
| C10G 45/60 | (2006.01) |
| C10G 47/00 | (2006.01) |
| B01J 35/08 | (2006.01) |
| B01J 35/10 | (2006.01) |

(52) U.S. Cl. ................ 208/113; 208/111.3; 208/216 R; 208/251 H; 502/8

(58) Field of Classification Search ................ 208/113, 208/111.3, 216 R, 241 H, 251 HR, 216; 502/8
See application file for complete search history.

(56) References Cited

U.S. PATENT DOCUMENTS

| 4,411,771 A * | 10/1983 | Bambrick et al. ........... 208/112 |
| 4,552,650 A * | 11/1985 | Toulhoat et al. ......... 208/216 PP |
| 4,874,506 A | 10/1989 | MacArthur et al. |
| 5,384,297 A * | 1/1995 | Prada et al. .................... 502/66 |
| 6,132,597 A | 10/2000 | Harle et al. |
| 6,153,087 A * | 11/2000 | Bigeard et al. ................. 208/89 |
| 6,200,680 B1 * | 3/2001 | Takeda et al. ................ 428/402 |
| 6,309,537 B1 | 10/2001 | Harle et al. |
| 6,365,259 B1 * | 4/2002 | Brundage et al. ............ 428/116 |
| 6,387,248 B2 * | 5/2002 | Sherwood et al. ....... 208/216 PP |
| 6,436,280 B1 * | 8/2002 | Harle et al. ............. 208/216 R |
| 6,451,198 B2 * | 9/2002 | Morel et al. ................... 208/89 |
| 6,656,349 B1 * | 12/2003 | Fujita et al. ........... 208/216 PP |
| 2003/0085154 A1 | 5/2003 | Benazzi et al. |
| 2004/0138059 A1* | 7/2004 | Euzen et al. ................. 502/255 |

FOREIGN PATENT DOCUMENTS

| EP | 0098764 | 1/1984 |
| EP | 0297950 | 4/1989 |
| FR | 2787040 | 6/2000 |
| FR | 2830870 | 4/2003 |

* cited by examiner

*Primary Examiner*—Walter D Griffin
*Assistant Examiner*—Natasha Young
(74) *Attorney, Agent, or Firm*—Millen, White, Zelano, Branigan, P.C.

(57) ABSTRACT

A catalyst and process for hydrotreating and/or hydroconverting heavy metal-containing hydrocarbon feeds, said catalyst comprising a support in the form of beads based on alumina, at least one catalytic metal or a compound of a catalytic metal from group VIB (column 6 in the new periodic table notation), optionally at least one catalytic metal or compound of a catalytic metal from group VIII (columns 8, 9 and 10 of the new periodic table notation), with a pore structure composed of a plurality of juxtaposed agglomerates, each formed by a plurality of acicular platelets, the platelets of each agglomerate being generally radially orientated with respect to each other and with respect to the center of the agglomerate. The catalyst also comprises at least one doping element selected from the group constituted by phosphorus, boron, silicon (or silica which does not belong to that which could be contained in the selected support) and halogens.

18 Claims, No Drawings

DOPED SPHERICALLY-SHAPED SUPPORTED CATALYST AND PROCESS FOR HYDROTREATING AND HYDROCONVERTING METAL-CONTAINING OIL FRACTIONS

BACKGROUND OF THE INVENTION

1. Field of the Invention

The present invention relates to a catalyst comprising a support in the form of beads based on alumina, at least one catalytic metal or a compound of a catalytic metal from group VIB (column 6 in the new periodic table notation), optionally at least one catalytic metal or a compound of a catalytic metal from group VIII (columns 8, 9 and 10 of the new periodic table notation), with a pore structure composed of a plurality of juxtaposed agglomerates, each formed by a plurality of acicular platelets, the platelets of each agglomerate being generally radially orientated with respect to the other and with respect to the center of the agglomerate, said catalyst being characterized in that it further contains at least one doping element selected from the group constituted by phosphorus, boron, silicon and the halogens.

The present invention also relates to a process for preparing said catalyst.

The present invention also relates to the use of said catalyst in processes for converting metal-containing hydrocarbon feeds.

2. Description of Related Art

The skilled person is aware that during reactions for hydrorefining and/or hydroconverting petroleum fractions containing organometallic complexes, the majority of those complexes are destroyed in the presence of hydrogen, hydrogen sulfide, and a hydrotreatment catalyst. The constituent metal of such complexes then precipitates out in the form of a solid sulfide which then becomes fixed on the internal surface of the pores. This is particularly the case for vanadium, nickel, iron, sodium, titanium, silicon, and copper complexes which are naturally present to a greater or lesser extent in crude oils depending on the origin of the crude and which, during distillation, tend to concentrate in the high boiling point fractions and in particular in residues. This is also the case for liquefied coal products which also comprise metals, in particular iron and titanium. The general term hydrodemetallization is used to designate those organometallic complex destruction reactions in hydrocarbons.

The accumulation of solid deposits in catalyst pores can continue until a portion of the pores controlling access of reactants to a fraction of the interconnected pore network is completely blocked so that said fraction becomes inactive even if the pores of that fraction are only slightly blocked or even intact. That phenomenon can thus cause premature and very severe catalyst deactivation. It is particularly sensitive in hydrodemetallization reactions carried out in the present of a supported heterogeneous catalyst. The term "heterogeneous" means not soluble in the hydrocarbon feed. In that case, it has been shown that the pores on the periphery are blocked more quickly than the central pores. Similarly, the pore mouths block up more quickly than their other portions. Pore blocking is accompanied by a gradual reduction in their diameter, which increasingly limits molecule diffusion and increases the concentration gradient, thus accentuating the heterogeneity of the deposit from the periphery to the interior of the porous particles to the point that pores opening to the outside are very rapidly blocked: access to the practically intact internal pores of the particles is thus denied to the reactants and the catalyst is prematurely deactivated.

The phenomenon described above is known as pore mouth plugging. Proofs for its existence and an analysis of its causes have frequently been published in the international scientific literature, e.g.:

"Catalyst deactivation through pore mouth plugging" presented at the $5^{th}$ International Chemical Engineering Symposium at Houston, Tex., U.S.A., March 1978, or "Effects of feed metals on catalyst aging in hydroprocessing residuum" in Industrial Engineering Chemistry Process Design and Development, volume 20, pages 262 to 273 published in 1981 by the American Chemical Society, or more recently in "Effect of catalyst pore structure on hydrotreating of heavy oil" presented at the National conference of the American Chemical Society at Las Vegas, U.S.A., $30^{th}$ Mar. 1982.

A catalyst for hydrotreating heavy metal-containing hydrocarbon cuts must thus be composed of a catalytic support with a porosity profile which is particularly suitable for the specific diffusional constraints of hydrotreatment and with a texture adapted to proper capture of metallic impurities, while avoiding the plugging problems mentioned above.

The catalysts usually used are composed of a alumina-based support having a particular porosity and an active phase based on mixed sulfides constituted both by a sulfide of a metal from group VIB (preferably molybdenum) and a sulfide of a metal from group VIII (preferably Ni or Co). The metals are deposited in the oxide state and are sulfurized so that they are active for hydrotreatment. The atomic ratio between the element from group VIII and the element from group VIB which is usually considered to be optimal is a group VIII/group VIB ratio in the range 0.4 to 0.6. Recently, it has been shown in European patent EP-A1-1 364 707 (FR-A-2 839 902) that independently of the porous texture, a ratio of less than 0.4 can limit deactivation of the catalysts and thus extend the service life of the catalysts.

The skilled person is aware that two types of alumina based support exist for catalysts for hydrorefining and/or hydroconverting heavy metal-containing hydrocarbon feeds. Those supports are distinguished by their pore distribution profile.

The first, which is bimodal in nature, is characterized by the presence of two distinct families of pores, one in the mesopore range, the other in the macropore range. Mesopores are defined as pores with a diameter of less than 500 Å and macropores are pores with a diameter of more than 500 Å, the porosity being measured by the mercury intrusion method. The function of mesopores is to develop a large specific surface area, which multiplies the chances of contact between reactive molecules and catalytic sites. The macropores act to irrigate the set of mesoporous domains (where the active phase is concentrated) by reactive molecules and to carry out the asphaltene disaggregation reaction to reduce their size.

That type of bimodal support can be prepared from a gel of boehmite or pseudoboehmite type alumina or by co-mixing a γ alumina feed or alumina calcined with a binder which may be a boehmite or pseudoboehmite type alumina (U.S. Pat. No. 5,089,463—Chevron) or an organic compound such as cellulose acetate (EP-A1-1 060 794, Japan Energy Corporation) or by co-mixing a boehmite or pseudoboehmite type alumina gel with recycled fines (U.S. Pat. No. 5,827,421—Texaco). The active phase can be introduced in the oxide state either by impregnating a solution of salts of the elements to be deposited (U.S. Pat. No. 5,827,42113 Texaco), or during preparation of the support (U.S. Pat. No. 4,880,525—Shell). These catalysts are usually in the form of extrudates, but can also be in the form of beads (U.S. Pat. No. B1 6,656,349—Nippon Ketjen).

The impact of the pore distribution of such bimodal catalysts has been widely studied. According to patent EP-A-1 060 794, the presence of at least 0.32 cm³/g of macropores (over 500 Å) and of medium size mesopores in the range 80 to 200 Å can produce a catalyst having both a high initial activity and a high metal retention capacity as well as a long service life. The proportion of macropores has been the subject of debate since, according to U.S. Pat. No. 5,397,456, there exists a compromise between increasing the macroporosity to encourage diffusion of large molecules and reducing the macroporosity to limit poisoning inside the grains. According to those authors, 11% to 18% of the pore volume present in pores larger than 250 Å is a good proportion. Further, according to the U.S. Pat. No. 5,827,421, a catalyst having a large pore volume (0.82 to 0.98 cm³/g) and the feature of having large mesopores (55 to 64.5% of the pore volume between 110-130 Å±50 Å) and a large fraction of macropores (27% to 34% of the pore volume above 250 Å) is particularly good when maximizing the converting said feeds while limiting the formation of sediments in the conversion products and maximizing desulfurization.

Such catalysts with a bimodal porosity profile are highly active, but have a poorer retention capacity than catalysts with a polymodal porosity profile.

The second porosity profile for alumina-based supports for hydrorefining and/or hydroconverting metal-containing hydrocarbon feeds is the polymodal nature. The cumulative distribution curve as a function of the pore diameter obtained by the mercury intrusion method is neither monomodal nor bimodal in that no distinct pore families appear with pore diameters centered on well defined mean values, but rather, a relatively continuous distribution of pores between two extreme diameter values. Between those two extremes, there is no horizontal plateau on the pore distribution curve. Said polymodal distribution is linked to a "chestnut burr" or "sea urchin" pore structure obtained with alumina agglomerates prepared by rapid dehydration of hydrargillite then agglomeration of the flash alumina powder obtained, according to one of the Applicant's patents (U.S. Pat. No. 4,552,650—IFP). The prepared alumina agglomerates can be in the form of beads or in the form of extrudates, as shown in patents FR-A-2 764 213 and U.S. Pat. No. 6,043,187.

The chestnut burr or sea urchin structure is constituted by a plurality of juxtaposed agglomerate each formed by a plurality of acicular platelets, the platelets of each agglomerate being orientated generally radially with respect to each other and with respect to the center of the agglomerate at least 50% of the acicular platelets have a dimension along their longest axis in the range 0.05 to 5 micrometers, preferably in the range 0.1 to 2 micrometers, a ratio of said dimension to their mean width in the range 2 to 20, preferably 5 to 15, a ratio of said dimension to their mean thickness in the range 1 to 5000, preferably in the range 10 to 200. At least 50% of the acicular platelet agglomerates constitute a collection of pseudo-spherical particles with a mean size in the range 1 to 20 micrometers, preferably in the range 2 to 10 µm. Very satisfactory images for representing such a structure is a pile of resinous chestnut burrs, or a pile of sea urchins, hence the name of the pore structure—chestnut burr or sea urchin— applied by the skilled person.

The majority of pores is constituted by free spaces located between radiating acicular platelets. Because of their "wedge" nature, those pores have a continuously variable diameter of between 100 and 1000 Å. The network of interconnecting macropores results from the space left free between the juxtaposed agglomerates.

Said catalysts with a polymodal porosity profile have a pore distribution (determined by the mercury porosimetry method) which is preferably characterized as follows:
   total pore volume in the range 0.7 to 2 cm³/g;
   % of total pore volume as pores with a mean diameter of less than 100 Å: between 0 and 10;
   % of total pore volume as pores with a mean diameter in the range 100 to 1000 Å: between 40 and 90;
   % of total pore volume as pores with a mean diameter in the range 1000 to 5000 Å: between 5 and 60;
   % of total pore volume as pores with a mean diameter in the range 5000 to 10000 Å: between 5 and 50;
   % of total pore volume as pores with a mean diameter of more than 10000 Å: between 5 and 20.

The specific surface area for said catalysts, measured by the BET method, is in the range 50 to 250 m²/g.

The chestnut burr or sea urchin pore structure associated with the pore distribution characteristics described above can produce hydrorefining and/or hydroconversion catalysts with very high retention powers, while keeping a high hydrodemetallization activity, which are not possible with bimodal catalysts. The reasons are that the "wedge" shape of the mesopores of the chestnut burr or sea urchin structure compensate for or remove the reactant concentration gradients which would normally be established in a cylindrical pore, which is supplemented by a geometry which is highly favorable for discouraging pore mouth clogging. Further, every mesopore or nearly every mesopore has independent access to the interstitial macropores, encouraging homogeneous accumulation of deposits without premature deactivating clogging.

Said catalysts, however, suffer from the disadvantage of being less active as regards initial activity than bimodal catalysts for HDM (hydrodemetallization), $HDAC_7$ (hydroconverting asphaltenes that are insoluble in n-heptane), and HDCCR (hydroconverting carbon-containing residues quantified by Conradson carbon analysis). This initial activity criterion is currently important both for fixed bed residue hydrorefining and for ebullated bed residue hydroconversion.

In fixed bed residue hydrorefining processes, although said HDM catalysts have a high retention power, necessary for processing hydrocarbon feeds with high metals contents (Ni+V over 40 ppm, e.g.), the poorer initial performances for the $HDAC_7$, HDM, HDCCR functions of this type of catalyst are deleterious to the performances of the downstream HDS catalysts, which are thus poorly protected from asphaltenes, deposition of the metals Ni+V and coke.

In ebullated bed hydroconversion processes processing hydrocarbon feeds with high metal contents (Ni+V of more than 250 ppm, for example), the initial poorer performance of said catalyst with a chestnut burr pore structure or sea urchin pore structure renders necessary an increasing daily quantity of fresh makeup catalyst.

For hydrocarbon feeds containing high metals contents, the bead form is preferred to the extrudate form both for fixed bed hydrorefining and for ebullated bed hydroconversion.

For fixed bed hydrorefining, the bead form of the HDM catalyst generates less initial delta P (loss on ignition), allowing the catalyst cycle period to be extended. The bead form also allows the catalyst to be discharged more easily because intergranular plugging is reduced. Further, size grading of the beads is easy to carry out and allows the delta P of the fixed bed to be reduced while maintaining good metal retention (Ni+V). The catalyst in the bead form is preferred in the context of an HDM application.

For ebullated bed hydroconversion, the bead form allows more homogeneous bed fluidization and has improved abrasion resistance properties compared with the extruded form. Bead movement is more homogeneous and the homogeneity of the solids in the bed produces good metal retention by avoiding segregation due to gravity. The bead size can also be adjusted as a function of the desired chemical activity to minimize problems linked to diffusion of molecules in the pores of the catalyst. Metals capture is considerably increased in an ebullated bed compared with a fixed bed.

Surprisingly, the Applicant has discovered that adding a doping element selected from the group formed by phosphorus, boron, silicon and the halogens to polymodal catalysts with a chestnut burr type texture in bead form can increase the initial activity of said catalysts, and thus provides better protection for the catalysts located downstream in fixed bed processes, but can also reduce the daily quantity of fresh makeup catalyst used in ebullated bed processes.

DETAILED DESCRIPTION OF THE INVENTION

The invention concerns a catalyst for hydrorefining (hydrotreatment) and/or hydroconverting heavy metal-containing hydrocarbons, having both a high initial activity and an exceptionally high retaining power.

Said catalyst comprises a porous alumina-based support which is characterized by a chestnut burr or sea urchin pore structure which is in the form of beads, at least one catalytic metal or a compound of a catalytic metal from group VIB (column 6 in the new periodic table notation), preferably molybdenum, and optionally at least one catalytic metal or a compound of a catalytic metal from group VIII (columns 8, 9 and 10 of the new periodic table notation), preferably nickel. The catalyst also comprises at least one doping element selected from phosphorus, boron, silicon and the halogens (group VIIA or column 17 in the new periodic table notation), preferably phosphorus. Silicon, deposited on the catalyst and henceforth considered as a doping element, must be distinguished from silicon which may be present in the initial support in an endogenous manner.

Without wishing to be bound to a particular theory, it appears that the improved properties regarding the initial activity of the catalyst of the present invention are due to a major increase in the dispersion of the initial active phase on this type of support due to the presence of at least one doping element.

The quantity of metal from group VIB, expressed as a % by weight of oxide with respect to the final catalyst weight, may be in the range 1% to 20%, preferably in the range 7% to 10%.

The quantity of non noble metal from group VIII, expressed as the % by weight of oxide with respect to the final catalyst weight, may be in the range 0 to 10%, preferably in the range 1.5% to 3%.

The quantity of phosphorus, expressed as the % by weight of oxide with respect to the final catalyst weight, may be in the range 0.3% to 10%, preferably in the range 1% to 5%, and more preferably in the range 1.5% to 3%.

The quantity of boron, expressed as the % by weight of oxide with respect to the final catalyst weight, is less than 6%, preferably less than 2%.

The atomic ratio between the elemental phosphorus and the group VIB element is advantageously in the range 0.3 to 0.6.

When at least one doping element is silicon, the silicon content is in the range 0.1% to 10% of the weight of oxide with respect to the final catalyst weight.

When at least one doping element is a halogen element (group VIIA), the halogen content is less than 5% by weight with respect to the final catalyst weight.

Preparation of Support

The support the use of which is an essential element of the invention is present in the form of alumina beads with a diameter which is generally in the range 0.5 to 20 mm, preferably in the range 1 to 10 mm, and more preferably in the range 1 to 6 mm. Said support contains 100 to 1000 parts per million by weight of silicon. It is preferably obtained using the method described in U.S. Pat. No. 4,552,650:

a) the active alumina beads are treated in an aqueous medium constituted by a mixture of at least one acid that can dissolve at least a portion of the alumina of the beads and at least one compound which supplies an anion which is capable of combining with aluminum ions in solution, the latter compound being a chemical species which is distinct from said acid;

b) simultaneously or subsequently, the treated beads undergo a treatment at a temperature in the range from about 80° C. to about 250° C. for a period in the range from about a few minutes to about 36 hours;

c) optionally, the beads are dried and they undergo thermal activation at a temperature in the range from about 500° C. to about 1100° C.

The active alumina beads employed in the present invention are prepared by granulation from active alumina powder with a low crystallinity and/or amorphous structure, using the process described in FR-A-1 438 497. That process consists of moistening active alumina with a low crystallinity and/or amorphous structure with an aqueous solution, agglomerating it in a granulator, aging the beads obtained in a moist atmosphere at a low temperature, preferably in the range 60° C. to about 100° C., drying then calcining said beads at a temperature in the range from about 250° C. to about 900° C.

The term "low crystallinity structure alumina" means an alumina the X ray analysis of which produces a diagram which has only one or a few diffuse peaks corresponding to low temperature crystal transition phases of aluminas and essentially comprising khi, rho, eta, gamma and pseudogamma phases and mixtures thereof.

The active alumina employed is generally obtained by rapid dehydration of aluminum hydroxides such as bayerite, hydrargillite or gibbsite, nordstrandite or oxyhydroxides of aluminum, such as boehmite or diaspore. Said dehydration can be carried out in any suitable apparatus using a stream of hot gas. The inlet temperature of gas in the apparatus generally varies from about 400° C. to 1200° C. and the contact time for the hydroxide or oxyhydroxide with the hot gases is generally between a fraction of a second and 4 to 5 seconds.

The specific surface area, measured using the BET method, of the active alumina obtained by rapid dehydration of hydroxides or oxyhydroxides generally varies between about 50 and 400 m$^2$/g, the particle diameter is generally in the range from about 0.1 to 300 micrometers, preferably in the range 1 to 120 micrometers. The loss on ignition, measured by calcining at 1000° C., generally varies between 3% and 15%, which corresponds to a $H_2O/Al_2O_3$ mole ratio in the range from about 0.17 to 0.85.

In a particular implementation, an active alumina deriving from the rapid dehydration of Bayer hydrate (hydrargillite), which is industrial aluminum hydroxide and is readily accessible and very cheap, is preferably used; said active alumina is well known in the art; its preparation process has been described in FR-A-1 108 011.

The active alumina employed may be used as is or after having been treated in a manner such that the sodium hydroxide content, expressed as $Na_2O$ is less than 1000 ppm. The active alumina employed may or may not have been ground.

Preferably, porogenic agents are added during granulation. Particular porogenic agents which can be used are in particular wood flour, wood charcoal, cellulose, starches, naphthaline and, in general, all organic compounds which may be eliminated by calcining.

If appropriate, aging, drying and/or calcining of the beads can then be carried out.

The active alumina beads employed in the process of the invention generally have the following characteristics: their loss on ignition, measured by calcining at 1000° C., is in the range from about 1% to about 15%, their specific surface area is in the range from about 100 to about 350 m$^2$/g, their total pore volume is in the range from about 0.45 to about 1.5 cm$^3$/g.

The active alumina beads are treated in an aqueous medium constituted by a mixture of at least one acid which can dissolve at least a portion of the alumina in the beads and at least one compound which supplies an anion which can combine with the aluminum ions in solution.

The term "acid which can dissolve at least a portion of the alumina of the beads" means any acid which, when brought into contact with the active alumina beads as defined above, dissolves at least a portion of the aluminum ions. The acid must dissolve at least 0.5% and at most 15% by weight of the alumina in the beads. Its concentration in the aqueous treatment medium must be less than 20% by weight, preferably in the range 1% to 15%.

Preferably, strong acids are used such as nitric acid, hydrochloric acid, perchloric acid, sulfuric acid or weak acids employed in a concentration such that their aqueous solution has a pH of less than about 4.

The term "compound supplying an anion capable of combining with aluminum ions in solution" means any compound which is capable of liberating, in solution, an anion $A^{(n-)}$ which is capable of forming products in which the atomic ratio n(A/Al) is 3 or less with $Al^{(3+)}$ cations.

A particular case of these compounds is illustrated by basic salts with general formula $Al_2(OH)_xA_y$ in which 0<x<6; ny<6; n represents the number of charges on anion A.

The concentration of said compound in the aqueous treatment medium must be below 50% by weight, preferably in the range 3% to 30%.

Preferably, the compounds used are capable, in solution, of liberating anions selected from the group constituted by nitrate, chloride, sulfate, perchlorate, chloroacetate, dichloroacetate, trichloroacetate, bromoacetate, dibromoacetate, and anions with general formula RCOO(—), in which R represents a radical taken from the group comprising H, $CH_3$—, $C_2H_5$—, $CH_3CH_2$—$(CH_3)_2CH$—.

The compounds capable of liberating the anion $A^{(n-)}$ in solution can carry out said liberation either directly, for example by dissociation, or indirectly, for example by hydrolysis. The compounds can in particular be selected from the group comprising: mineral or organic acids, anhydrides, organic or mineral salts and esters. Examples of mineral salts which can be cited are alkali or alkaline-earth salts which are soluble in aqueous media, such as sodium, potassium, magnesium or calcium, ammonium salts, aluminum salts and rare earth salts.

Said first treatment can be carried out either by dry impregnation of the beads, or by immersing beads in the aqueous solution constituted by the mixture of the invention. The term "dry impregnation" means bringing alumina beads into contact with a volume of solution which is less than or equal to the total pore volume of the treated beads.

In a particularly preferred implementation, the aqueous medium used is a mixture of nitric acid and acetic acid or of nitric acid and formic acid.

Simultaneously or subsequently, the treated beads undergo a treatment at a temperature in the range from about 80° to about 250°, for a period of time in the range from about 5 minutes to about 36 hours.

Said hydrothermal treatment does not cause any loss of alumina.

Preferably, a temperature in the range 120° C. to 220° C. is used, for a period of time in the range from about 15 minutes to 18 hours.

Said treatment constitutes a hydrothermal treatment for active alumina beads which transforms at least a portion thereof into boehmite. Said hydrothermal treatment can be carried out either under saturated vapor pressure or at a partial pressure of water vapor of at least 70% of the saturating vapor pressure corresponding to the treatment temperature.

Associating an acid which can dissolve at least a portion of the alumina and an anion which can form the products described above during hydrothermal treatment causes a particular boehmite to be produced, a precursor for the acicular platelets of the support of the invention, the growth of which occurs radially from crystallization seeds.

Further, the concentration of the acid and of the compound in the treatment mixture and the hydrothermal treatment conditions employed are such that there is no loss of alumina. The increase in porosity following treatment is thus due to expansion of the beads during the treatment and not to a loss of alumina.

The treated beads are then optionally dried at a temperature which is generally in the range from about 100° C. to 200° C. for a period of time which is sufficient to remove water which is not chemically bound. The beads then undergo thermal activation at a temperature in the range from about 500° C. to about 1100° C. for a period in the range from about 15 minutes and 24 hours.

The activation operations can be carried out in several steps. Preferably, activation is carried out at a temperature in the range from about 550° C. to 950° C.

The resulting alumina beads preferably have the following characteristics:
- a specific surface area in the range 80 m$^2$/g to 250 m$^2$/g;
- a compact packing density in the range from about 0.25 to 0.65 cm$^3$/g;
- a total pore volume (TPV) in the range from about 0.5 to about 2.0 cm$^3$/g;
- a pore distribution, determined by the Hg porosimetry technique, which is preferably characterized as follows;
- % of total pore volume of pores with a mean diameter of less than 100 Å: between 0 and 10;
- % of total pore volume of pores with a mean diameter in the range 100 Å to 1000 Å: between 40 and 90;
- % of total pore volume of pores with a mean diameter in the range 1000 Å to 5000 Å: between 5 and 60;
- % of total pore volume of pores with a mean diameter in the range 5000 Å to 10000 Å: between 5 and 50;
- % of total pore volume of pores with a mean diameter of more than 10000 Å: between 5 and 20.

Said process for preparing alumina beads can modify the pore volume distribution depending on the size of the pores in the untreated beads. In particular, it can increase the proportion of pores in the range 100 Å to 1000 Å, reduce the proportion of pores of less than 100 Å, reduce the proportion of pores of more than 5000 Å and only slightly modify the proportion of pores in the range 1000 Å to 5000 Å.

The alumina beads obtained may have been thermally stabilized by rare earths, silica or alkaline-earth metals, as is well known to the skilled person. In particular, they may be stabilized using the process described in U.S. Pat. No. 4,061,594.

Deposition of Active Phase and Doping Element or Elements

The active phase in the oxide state and the doping element or elements are preferably deposited on the alumina beads using the "dry" impregnation method which is well known to the skilled person. Impregnation is highly preferably carried out in a single step using a solution containing all of the constituent elements of the final catalyst (co-impregnation). Other impregnation sequences may be employed to obtain the catalyst of the present invention.

It is also possible to introduce a portion of the metals and a portion of the doping element or elements or even all thereof during the preparation of the support, in particular during the granulation step.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts acetylacetonates, xanthates, fluorides, chlorides, carbonyl complexes, thiomolybdates and carboxylates. Preferably, oxides and ammonium salts are used, such as ammonium molybdate, ammonium heptamolybdate or ammonium tungstate.

Sources of group VIII elements that can be used are known; examples are nitrates, sulfates, phosphates, halides, carboxylates such as acetates and carbonates, hydroxides and oxides.

The preferred phosphorus source is orthophosphoric acid, but its salts and esters such as alkaline phosphates, ammonium phosphates, gallium phosphates or alkyl phosphates are also suitable. Phosphorous acids, for example hypophosphorous acid, phosphomolybdic acid and its salts, or phosphotungstic acid and its salts can also be used. Phosphorus can, for example, be introduced in the form of a mixture of phosphoric acid and a basic organic compound containing nitrogen, such as ammonia, primary and secondary amines, cyclic amines, pyridine group compounds, quinolines and pyrrole group compounds.

The boron source may be boric acid, preferably orthoboric acid $H_3BO_3$, ammonium biborate or pentaborate, boron oxide, or boric esters. Boron can, for example, be introduced using a solution of boric acid in a water/alcohol mixture.

A variety of silicon sources can be used. Examples are ethyl orthosilicate $Si(OEt)_4$, siloxanes, silicones and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture.

Sources of group VIIA elements (halogens) which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium fluorosilicate $Na_2SiF_6$. Fluorine can be introduced, for example by impregnating with an aqueous hydrofluoride solution or ammonium fluoride.

Advantageously, after impregnating the support, the process for preparing the catalyst of the present invention comprises the following steps:
leaving the moist solid in a moist atmosphere at a temperature in the range 10° C. to 80° C.;
drying the moist solid obtained at a temperature in the range 60° C. to 150° C.;
calcining the solid obtained after drying at a temperature in the range 150° C. to 800° C.

Calcining is not necessary if the impregnation solutions are free of compounds containing the element nitrogen.

Characteristics of the Catalyst

The catalyst of the present invention comprises a support in the form of alumina-based beads, at least one catalytic metal or a compound of a catalytic metal from group VIB (column 6 of the new periodic table notation), optionally at least one catalytic metal or a compound of a catalytic metal from group VIII (columns 8, 9 and 10 of the new periodic table notation), the pore structure of said catalyst being composed of a plurality of juxtaposed agglomerates, each formed by a plurality of acicular platelets, the platelets of each agglomerate being orientated generally radially with respect to each other and with respect to the center of the agglomerate.

The catalyst also comprises at least one doping element selected from the group constituted by phosphorus, boron, silicon (or silica which does not belong to that which could be contained in a selected support) and the halogens.

Preferably, the group VIB element is molybdenum.

Preferably, when present, the group VIII element is nickel.

The quantity of group VIB metal, expressed as the % by weight of oxide with respect to the final catalyst weight, can be in the range 1% to 20%, preferably in the range 1% to 10%, and more preferably in the range 7% to 10%.

The quantity of non noble group VIII metal, expressed as the % by weight of oxide with respect to the final catalyst weight, can be in the range 0 to 10%, preferably in the range 1.5% to 3%.

The preferred doping element is phosphorus. The quantity of phosphorus, expressed as the % by weight of oxide with respect to the final catalyst weight, is advantageously in the range 0.3% to 10%, preferably in the range 1% to 5%, and more preferably in the range 1.5% to 3%.

In this case, the catalyst may also contain at least one other doping element selected from the group formed by boron, silicon and the halogens.

When at least one doping element is boron, the quantity of boron, expressed as the % by weight of oxide with respect to the final catalyst weight, is less than 6%, preferably less than 2%.

The atomic ratio between the elemental phosphorus and the group VIB element is advantageously in the range 0.3 to 0.6.

When at least one doping element is silicon, the silicon content is in the range 0.1% to 10% by weight with respect to the final catalyst weight.

When at least one doping element is a halogen, the halogen content is less than 5% by weight with respect to the final catalyst weight.

Preferably, the catalyst contains at least one group VIB element in an amount in the range 1% to 10% by weight of oxide with respect to the final catalyst weight, optionally at least one group VIII element and phosphorus.

A further preferred catalyst of the invention contains at least one group VIB element in an amount in the range 1% to 10% by weight of oxide with respect to the final catalyst weight, optionally at least one group VIII element and silicon.

The pore distribution of the catalyst, determined by the mercury porosity technique, is as follows:

- % of total pore volume as pores with a mean diameter of less than 100 Å: between 0 and 10;
- % of total pore volume as pores with a mean diameter in the range 100 to 1000 Å: between 40 and 90;
- % of total pore volume as pores with a mean diameter in the range 1000 to 5000 Å: between 5 and 60;
- % of total pore volume as pores with a mean diameter in the range 5000 to 10000 Å: between 5 and 50;
- % of total pore volume as pores with a mean diameter of more than 10000 Å: between 5 and 20.

The total pore volume of the catalysts of the invention, determined by mercury porosimetry, is in the range 0.4 to 1.8 $cm^3/g$.

The compact packing density of the catalysts of the invention is in the range 0.35 to 0.80 $cm^3/g$.

Preferably, in the catalysts of the present invention, the pore diameter at VHg/2 is in the range 300 to 700 Å, i.e. the mean diameter of pores the volume of which on the pore distribution graph corresponds to half of the total pore volume is in the range 300 to 700 Å, i.e. 30 to 70 nm.

The catalyst of the invention is in the form of alumina beads with a diameter that is generally in the range 0.5 to 20 mm, preferably in the range 1 to 10 mm and more preferably in the range 1 to 6 mm.

The catalysts of the invention have a specific surface area, measured using the BET method, in the range 50 to 250 $m^2/g$.

The catalyst beads generally have an individual particle crush strength (IPCS) of at least 1 daN/mm and a crush strength (CS) of at least 1 MPa. Further, the percentage loss on wear in accordance with ASTM D4050 for said beads is generally less than 2% of the weight of the support.

The method for measuring the individual particle crush strength (IPCS) consists of measuring the form of the maximum compression which a grain can tolerate prior to its rupture when the product is placed between two flats being displaced at a constant rate of 5 cm/min.

The compression is applied perpendicular to one of the grain generatrices and the individual particle crush strength is expressed as the ratio of the force to the length of the grain generatrix.

The method for measuring the crush strength (CS) consists of subjecting a certain quantity of grains to an increasing pressure above a sieve and recovering the fines deriving from crushing the grains. The crush strength corresponds to the force exerted to obtain fines amounting to 0.5% of the weight of the grains undergoing the test. The method for measuring the wear strength according to ASTM D4050 consists of rotating a sample of catalyst in a cylinder. The wear is then calculated by the following formula:

% loss on wear=100(1−weight of catalyst over 0.6 mm after test/weight of catalyst over 0.6 mm charged into cylinder).

Advantageously, the process for preparing catalysts of the present invention comprises at least the following steps:

a) treating the active alumina beads in an aqueous medium constituted by a mixture of at least one acid that can dissolve at least a portion of the alumina of the beads and at least one compound which supplies an anion which is capable of combining with aluminum ions in solution, the latter compound being an individual chemical species which is distinct from said acid;

b) simultaneously or subsequently, subjecting the treated beads to a treatment at a temperature in the range 80° C. to 250° C. for a period in the range from a few minutes to 36 hours;

c) optionally, drying the beads and subjecting them to thermal activation at a temperature in the range 500° C. to 1100° C.;

d) introducing into the support at least one doping element selected from the group formed by boron, phosphorus, silicon and elements from group VIIA (halogens), at least one element from group VIB and optionally at least one element from group VIII.

The active phase in the oxide state and the doping element or elements are preferably deposited on the alumina beads in step d) by impregnation, in particular using the "dry" impregnation method which is known to the skilled person.

Advantageously, after impregnating the support, the process for preparing the catalyst of the present invention comprises the following steps:

- leaving the moist solid in a moist atmosphere at a temperature in the range 10° C. to 80° C.;
- drying the moist solid obtained at a temperature in the range 60° C. to 150° C.;
- optionally, calcining the solid obtained after drying at a temperature in the range 150° C. to 800° C.

Calcining is not necessary in the case in which the impregnating solutions are free of compounds containing the element nitrogen.

The catalysts of the invention then preferably undergo a sulfurization treatment to transform at least a portion of the metallic species into sulfide before bringing them into contact with the feed to be treated. This sulfurization activation treatment is well known to the skilled person and may be carried out using any method which has already been described in the literature.

One conventional sulfurization method which is well known to the skilled person consists of heating the mixture of solids in a stream of a mixture of hydrogen and hydrogen sulfide or in a stream of a mixture of hydrogen and hydrocarbons containing sulfur-containing molecules at a temperature in the range 150° C. to 800° C., preferably in the range 250° C. to 600° C., generally traversed bed reaction zone.

The catalysts prepared in accordance with this preparation process are included in the scope of the invention.

Use of a Catalyst in Accordance with the Invention in Converting Hydrocarbon-Containing Feeds The catalysts of the invention can be employed in any type of process that can convert metal-containing hydrocarbon-containing feeds.

As an example, the feeds may be atmospheric residues or vacuum residues from straight run distillation, deasphalted oils, residues from conversion processes such as those from coking or from fixed bed, ebullated bed or moving bed hydroconversion. Said feeds can be used as they are or diluted by a hydrocarbon-containing fraction or a mixture of hydrocarbon-containing fractions which can, for example, be selected from products from the FCC process, a light cycle oil (LCO), a heavy cycle oil (HCO), a decanted oil (DO), a slurry, or from distillation or gas oil fractions, in particular those obtained by vacuum distillation known as vacuum gas oil (VGO). The heavy feeds can thus comprise cuts from the coal liquefaction process, aromatic extracts or any other hydrocarbon-containing cuts.

Heavy feeds generally have initial boiling points of more than 300° C., with more than 1% by weight of molecules having a boiling point of more than 500° C., a Ni+V metals content of more than 1 ppm by weight, preferably more than 20 ppm by weight and an asphaltenes content, precipitated in heptane, of more than 0.05%, preferably more than 1% by weight.

In one implementation, a portion of the converted effluents can be recycled upstream of a unit operating the hydroconversion and/or hydrotreatment process.

The heavy feeds can be mixed with powdered coal, and the mixture is generally termed a slurry. Said feeds may be by products derived from converting coal and re-mixed with fresh coal. The coal content in the heavy feed preferably gives a 1/4 (oil/coal) ratio and can vary between 0.1 and 1. The coal may contain lignite, or it may be a sub-bituminous coal or it may be bituminous. Any type of coal may be suitable for use in the invention, both in a first reactor or in any reactor operating in ebullated bed mode.

EMBODIMENTS

This catalyst can be employed in hydrotreatment and/or hydroconversion processes.

The catalyst of the invention can be used in a fixed bed process the essential purpose of which is the elimination of metals, sulfur and to reduce the mean boiling point of those hydrocarbons. In a fixed bed process, the catalyst is generally employed at a temperature in the range 320° C. to 450° C., preferably 350° C. to 410° C., at a partial pressure of hydrogen of about 3 MPa to about 30 MPa, preferably 10 to 20 MPa, at an hourly space velocity of about 0.05 to 5 volumes of feed per volume of catalyst per hour, preferably 0.2 to 0.5 volumes of feed per volume of catalyst per hour, and with a ratio of gaseous hydrogen to liquid hydrocarbon feed in the range 200 to 5000 normal cubic meters per cubic meter, preferably 500 to 1500 normal cubic meters per cubic meter.

The catalyst of the present invention can also be employed in an ebullated bed process using the same feeds. In such a process, the catalyst is generally employed at a temperature in the range 320° C. to 470° C., preferably 400° C. to 450° C., at a partial pressure of hydrogen of a 3 MPa to about 30 MPa, preferably 10 to 20 MPa, at a space velocity of about 0.1 to 10 volumes of feed per volume of catalyst per hour, preferably 0.5 to 2 volumes of feed per volume of catalyst per hour, and with a ratio of gaseous hydrogen to liquid hydrocarbon feed in the range 100 to 3000 normal cubic meters per cubic meter, preferably 200 to 1200 normal cubic meters per cubic meter.

A particular case of an application of the catalyst of the invention is the use of the catalyst in the presence of coal mixed with heavy feed to be converted. As described in U.S. Pat. No. 4,874,506 and U.S. Pat. No. 4,437,973, the powdered coal is mixed with a hydrocarbon feed that is richer in hydrogen to be converted in the presence of hydrogen and a supported catalyst. This operation is generally carried out to hydroconvert residues in one or more reactors in series operating in ebullated bed mode. The use of the catalyst of the invention in the form of beads could improve the hydrodynamic behavior of the system and ease continuous downdrafting of the catalyst. As an example, liquid converting coal is carried out by the first reactor and then HDM and impurity capture is carried out at the same time and then a finishing step can be carried out using other catalysts.

The catalysts of the present invention preferably undergo a sulfurization treatment to at least partially transform the metallic species into sulfide before bringing them into contact with the feed to be treated. This sulfurization activation treatment is well known to the skilled person and can by carried out using any method that has been described in the literature.

One conventional sulfurization method that is well known to the skilled person consists of heating the mixture of solids in a stream of a mixture of hydrogen and hydrogen sulfide or in a stream of a mixture of hydrogen and hydrocarbons containing sulfur-containing molecules at a temperature in the range 150° C. to 800° C., preferably in the range 250° C. to 600° C., generally traversed bed reaction zone.

The following examples illustrate the invention described in this patent without, however, limiting its scope.

Example 1

Preparation of Alumina Support Forming Part of the Composition of the Catalysts

The starting material was alumina obtained by very rapid decomposition of hydrargillite in a hot air stream (T=1000° C.). The product obtained was constituted by a mixture of transition aluminas: (khi) and (rho) aluminas. The specific surface area of the product was 300 m$^2$/g and the loss on ignition (LOI) was 5%.

The alumina was ground with a ball mill to obtain a powder with a mean particle diameter of 7 micrometers.

This alumina was mixed with wood flour as a porogenic agent (15% wood) then formed in a granulator or bowl granulator. Water was added to aid forming.

The beads obtained were dried and calcined then underwent an aging step by passing steam at 100° C. for 24 hours.

Said beads were immersed in a 50 g/l acetic acid solution for about 5 hours.

They were then removed from the solution, drained and introduced into an autoclave for about 2 hours at a temperature of 210° C. and a pressure of 20.5 bars.

The beads from the autoclave outlet were dried for 4 hours at 100° C. and calcined for 2 hours at 650° C.

Beads with a grain size between 1.4 and 2.8 mm were selected.

Example 2

Preparation of Catalyst A Supported on the Support of Example 1

We dry impregnated the support of Example 1 with an aqueous solution containing molybdenum and nickel salts. The molybdenum salt was ammonium heptamolybdate $(NH_4)_6Mo_7O_{24} \cdot 4H_2O$ and the nickel salt was nickel nitrate $Ni(NO_3)_2 \cdot 6H_2O$. After aging at room temperature in a water-saturated atmosphere, the impregnated extrudates were dried overnight at 120° C. then calcined at 500° C. for 2 hours in dry air. The final molybdenum trioxide content was 11% of the final catalyst weight. The final nickel oxide NiO content was 2.4% of the final catalyst weight.

The textural and physico-chemical characteristics of catalyst A are recorded in Table 1.

TABLE 1

|  | Catalyst | | |
|---|---|---|---|
|  | A | B | C |
| MoO$_3$ (wt %) | 11.0 | 9.4 | 9.2 |
| NiO (wt %) | 2.4 | 2.0 | 1.9 |
| P$_2$O$_5$ (wt %) | — | 2.0 | — |
| SiO$_2$ (wt %) | — | — | 3.5 |

TABLE 1-continued

| | Catalyst | | |
|---|---|---|---|
| | A | B | C |
| Ni/Mo (at/at) | 0.42 | 0.40 | 0.39 |
| P/Mo (at/at) | — | 0.42 | — |
| dMo (at/nm$^2$) | 3.9 | 3.8 | 3.8 |
| DRT (cm$^3$/g) | 0.505 | 0.517 | 0.530 |
| S$_{BET}$ (m$^2$/g) | 119 | 105 | 102 |
| V$_{pt}$ Hg (cm$^3$/g) | 0.96 | 0.94 | 0.95 |
| dp at VHg/2 (Å) | 400 | 420 | 400 |
| VHg >500 Å (cm$^3$/g) | 0.45 | 0.44 | 0.45 |
| V Hg >1000 Å (cm$^3$/g) | 0.32 | 0.30 | 0.31 |

Example 3

Preparation of Catalyst B Supported on the Support of Example 1

We dry impregnated the support of Example 1 with an aqueous solution containing molybdenum and nickel salts and phosphoric acid. The molybdenum precursor was molybdenum oxide MoO$_3$ and the nickel precursor was nickel carbonate Ni(CO$_3$). After aging at room temperature in a water-saturated atmosphere, the impregnated extrudates were dried overnight at 120° C. then calcined at 500° C. for 2 hours in dry air. The final molybdenum trioxide content was 9.4% of the final catalyst weight. The final nickel oxide NiO content was 2% of the final catalyst weight. The final phosphoric oxide content was 2% of the final catalyst weight.

The textural and physico-chemical characteristics of catalyst b are recorded in Table 1.

Example 4

Preparation of Catalyst C Supported on the Support of Example 1

We dry impregnated the support of Example 1 with a solution prepared from MoO$_3$, H$_2$O$_2$, Ni(OH)$_2$, H$_2$SO$_4$ and a polydimethylsiloxane emulsion. After aging at room temperature in a water-saturated atmosphere, the impregnated extrudates were dried overnight at 120° C. then calcined at 500° C. for 2 hours in dry air. The final molybdenum trioxide content was 9.2% of the final catalyst weight. The final nickel oxide NiO content was 1.9% of the final catalyst weight. The final silicon oxide SiO$_2$ content was 3.5% of the final catalyst weight.

The textural and physico-chemical characteristics of catalyst C are recorded in Table 1.

Example 5

Comparison of Performances for Fixed Bed Hydrotreatment

Catalysts A, B and C described above were compared in a hydrotreatment test for different petroleum residues. They were an atmospheric residue (AR) of Middle Eastern origin (Arabian Light) and an atmospheric residue from an extra heavy Venezuelan crude (Boscan). These two residues were characterized by high viscosities, high Conradson carbon numbers and high asphaltene contents. The Boscan AR also contained very high amounts of nickel and vanadium.

The characteristics of these residues are shown in Table 2:

TABLE 2

| | | Arabian Light AR | Boscan AR |
|---|---|---|---|
| Density 15/4 | | 0.959 | 1.023 |
| Viscosity at 100° C. | mm$^2$/s | 25.6 | 1380 |
| Viscosity at 150° C. | mm$^2$/s | 7.66 | 120 |
| Sulfur | % by wt | 3.34 | 5.5 |
| Nitrogen | ppm | 2075 | 5800 |
| Nickel | ppm | 9 | 125 |
| Vanadium | ppm | 35 | 1290 |
| Iron | ppm | 1 | 8 |
| Carbon | % by wt | 84.7 | 83.40 |
| Hydrogen | % by wt | 11.2 | 10.02 |
| Aromatic carbon | % | 26 | 29.0 |
| Molecular weight | g/mol | 460 | 730 |
| Conradson carbon | % by wt | 9.5 | 16.9 |
| C5 asphaltenes | % by wt | 5.6 | 24.1 |
| C7 asphaltenes | % by wt | 3.1 | 14.9 |
| SARA | | | |
| Saturates | % by wt | 30.7 | 8.7 |
| Aromatics | % by wt | 47.5 | 35.0 |
| Resins | % by wt | 17.6 | 34.0 |
| Asphaltenes | % by wt | 3.0 | 14.6 |
| Simulated distillation | | | |
| IP | ° C. | 229 | 224 |
| 5% | ° C. | 325 | 335 |
| 10% | ° C. | 358 | 402 |
| 20% | ° C. | 404 | 474 |
| 30% | ° C. | 436 | 523 |
| 40% | ° C. | 468 | 566 |
| 50% | ° C. | 503 | |
| 60% | ° C. | 543 | |
| 70% | ° C. | 590 | |
| 80% | ° C. | 642 | |

The tests were carried out in a pilot hydrotreatment plant comprising a fixed bed tube reactor. The reactor was filled with one liter of catalyst. The fluid flow (residue+hydrogen) was an upflow in the reactor. This type of pilot unit represents the operation of an IFP HYVAHL unit reactor for fixed bed hydroconverting residues.

After a sulfurization step by circulating a gas oil cut with added dimethyldisulfide at a final temperature of 350° C. in the reactor, the unit was operated for 300 hours using Arabian Light atmospheric residue at 370° C., with a total pressure of 150 bars using a HSV of 0.5 l feed/l catalyst/h. The hydrogen flow rate was such that it had a ratio of 1000 l/l of feed. The test conditions using AL AR were isothermal, which allowed the initial deactivation of the catalyst to be measured by direct comparison of performances at different ages. The ages are expressed as hours of operation with atmospheric residue Arabian Light, zero time being taken at the time at which the test temperature was attained (370° C.).

The HDM, HDAsC7 and HDCCR performances are defined as follows:

HDM (wt %)=((ppm by wt Ni+V)$_{feed}$−(ppm by wt Ni+V)$_{test}$)/((ppm by wt Ni+V)$_{feed}$)*100

HDAsC7 (wt %)=((wt % asphaltenes insoluble in n-heptane)$_{feed}$−(wt % asphaltenes insoluble in n-heptane)$_{test}$)/((wt % asphaltenes insoluble in n-heptane)$_{feed}$)*100

HDCCR (wt %)=((wt % CCR)$_{feed}$−(wt % CCR)$_{test}$)/ ((wt % CCR)$_{feed}$)*100

Table 3 compares the HDM, HDAsC7 and HDCCR performances of catalysts A, B and C at the start of the test (50 hours) and at the end of the test (300 hours).

TABLE 3

| Catalyst + age | HDM (wt %) | HDAsC7 (wt %) | HDCCR (wt %) |
|---|---|---|---|
| A, 50 hours | 77 | 79 | 38 |
| B, 50 hours | 87 | 90 | 42 |
| C, 50 hours | 85 | 88 | 40 |
| A, 300 hours | 73 | 68 | 30 |
| B, 300 hours | 83 | 80 | 40 |
| C, 300 hours | 81 | 78 | 38 |

The feed was then changed by moving to the Boscan atmospheric residue. The test conditions aimed to maintain the HDM ratio constant at about 80% by weight throughout the cycle. To this end, catalyst deactivation was compensated for by a gradual increase in the reaction temperature. The test was stopped when the reaction temperature reached 420° C., a temperature considered to be representative of the temperature at the end of a cycle in an industrial residue hydroconversion unit.

Table 4 compares the quantities of nickel+vanadium from the Boscan AR deposited on the 3 catalysts.

TABLE 4

| Catalyst | Ni + V deposited (% of weight of fresh catalyst) |
|---|---|
| Catalyst A | 70 |
| Catalyst B | 85 |
| Catalyst C | 81 |

It thus appears that HDM catalysts doped with phosphorus (catalyst B) or silicon (catalyst C) and with a lower molybdenum content result in initial performances on AL RA (HDM, HDAsC7, HDCCR) that are better than those for the non doped catalyst having a much higher active phase content (catalyst A).

The presence of a phosphorus or silicon dopant also significantly improves the retaining power of this type of catalyst while keeping the HDM high (80%). It can also be seen that the phosphorus doping agent produces initial activity gains for AL AR and retention on Boscan AR that are higher than with the silicon dopant.

Example 6

Comparison of Performances in Ebullated Bed Hydroconversion

The performances of catalysts A, B and C were compared during a pilot test in a pilot unit comprising a tube reactor provided with a device which could permanently ebullate a catalyst within the reactor. The pilot unit employed was representative of an industrial H-OIL ebullated bed residue hydroconversion unit described in a number of patents, for example U.S. Pat. No. 4,521,295, U.S. Pat. No. 4,495,060.

The pilot reactor was charged with 1 liter of catalyst in bead form produced in accordance with the invention as described above.

The unit was charged with oil using gas oil from vacuum distillation, VGO, the characteristics of which are shown in Table 5.

TABLE 5

| Feed | VGO | VDR Safaniya | Boscan AR |
|---|---|---|---|
| Spec. grav. | 0.9414 | 1.0457 | 1.023 |
| Sulfur (wt %) | 2.92 | 5.31 | 5.5 |
| Nitrogen (ppm by wt) | 1357 | 4600 | 5800 |
| Viscosity (cSt) | 13.77 | 5110 | 1380 |
| Viscosity temp (° C.) | 100 | 100 | 100 |
| Viscosity (cSt) | 38.64 | 285 | 120 |
| Viscosity temp (° C.) | 70 | 150 | 150 |
| Conradson carbon (wt %) | | 23.95 | 16.9 |
| Asphalt C7 (wt %) | | 14.5 | 14.0 |
| Ni (ppm by wt) | <2 | 52 | 125 |
| V (ppm by wt) | 3.3 | 166 | 1290 |
| Simulated Distillation (D1160) (° C.) | | | |
| IP | 361 | 496 | 224 |
| 5% vol. | 416 | 536 | 335 |
| 10% vol. | 431 | 558 | 402 |
| 20% vol. | 452 | | 474 |
| 30% vol. | 467 | | 523 |
| 40% vol. | 479 | | 566 |
| 50% vol. | 493 | | |
| 60% vol. | 507 | | |
| 70% vol. | 522 | | |
| 80% vol. | 542 | | |
| :90% vol. | 568 | | |
| 95% vol. | 589 | | |
| EP | 598 | 558 | 566 |

The temperature was increased to 343° C. then the test feed, a Safaniya vacuum distillation residue (VDR), was injected. The reaction temperature was then raised to 410° C. The hydrogen flow rate was 600 l/l; the space velocity was 0.3 l/l hr.

The test conditions were isothermal, which allowed the initial deactivation of the catalyst to be measured by direct comparison of performances at different ages. The ages are expressed here as barrels of feed/pound of catalyst (bbl/lb), which represents the cumulative quantity of feed passed over the catalyst with respect to the charged weight of catalyst.

The conversion and HDM performances are defined as follows:

Conversion (wt %)=((wt % of 550° C.+)$_{feed}$−(wt % 550° C.+)$_{test}$)/((wt % 550° C.+)$_{feed}$)*100

HDM (wt %)=((ppm by wt Ni+V)$_{feed}$−(ppm by wt Ni+V)$_{test}$)/((ppm wt Ni+V)$_{feed}$)*100

The feed was then changed to Boscan atmospheric residue. This feed allowed the metal retention of the catalyst to be evaluated. The test aimed to keep the HDM in the range 80% and 60%. To this end, the reaction temperature was kept at 410° C. The test was stopped when the HDM percentage fell below 60%. Conversion was kept between 50% and 60% by weight to produce good fuel stability. To evaluate the stability of the products formed, a "P value Shell" measurement was carried out on the 350° C.+fraction of the effluent recovered after the test.

Table 6 compares the performances of catalysts A, B and C at the start of the test (1.6 bbl/lb) and at the end of the test (4.1 bbl/lb).

TABLE 6

| Catalyst + age | Conv. (wt %) | HDM (wt %) | Metal retention (wt %) | P value Shell |
|---|---|---|---|---|
| A, 1.6 bbl/lb, VDR Safaniya | 49 | 52 | 7.6 | 1.4 |
| B, 1.6 bbl/lb, | 54 | 55 | 8.1 | 1.4 |

TABLE 6-continued

| Catalyst + age | Conv. (wt %) | HDM (wt %) | Metal retention (wt %) | P value Shell |
|---|---|---|---|---|
| VDR Safaniya C, 1.6 bbl/lb, | 52 | 54 | 8 | 1.4 |
| VDR Safaniya A, 4.1 bbl/lb, Boscan AR | 51 | 60 | 70 | 1.2 |
| B, 4.1 bbl/lb, Boscan AR | 56 | 70 | 100 | 1.4 |
| C, A, 4.1 bbl/lb, Boscan AR | 54 | 68 | 95 | 1.4 |

It appears that the phosphorus-doped catalyst (catalyst B) and the catalyst doped with silicon (catalyst C) of the present invention can achieve a degree of converting the 550° C.+fraction that is higher than the catalyst which is not doped with phosphorus (catalyst A), all while producing stable products. Catalysts B and C have substantially improved hydrodemetallization and retention performances compared with catalyst A. It should also be noted that the phosphorus dopant allows higher conversion, HDM and retention gains than with the silicon dopant.

The invention claimed is:

1. A catalyst comprising an alumina-based support, at least one catalytic metal or a compound of a catalytic metal from group VIB, one catalytic metal or a compound of a catalytic metal from group VIII, with a pore structure composed of a plurality of juxtaposed agglomerates, each formed by a plurality of acicular platelets, the acicular platelets of each agglomerate being generally radially orientated with respect to each other and with respect to the center of the agglomerate, said support being in the form of beads having a size of 1 to 6 mm said catalyst further comprising phosphorous as a doping element, wherein the catalyst has a ratio of group VIII/group VIB metal of 0.4-0.6, a packing density of 0.35 to 0.80 cm$^3$/g, a pore diameter at $V_{Hg/2}$ of 300 Å to 700 Å, and a total pore volume, determined by mercury porosimetry, of 0.4 to 1.8 g/cm$^3$.

2. A catalyst according to claim 1, in which the amount of metal from group VIB, expressed as the % by weight of oxide with respect to the final catalyst weight, is in the range of 1% to 20% and in which the amount of metal from group VIII, expressed as the % by weight of oxide with respect to the final catalyst weight, is in the range of 0 to 10%.

3. A catalyst according to claim 2, in which the amount of metal from group VIB is in the range of 1% to 10% by weight of oxide.

4. A catalyst according to claim 1, in which the amount of phosphorus, expressed as the % by weight of oxide with respect to the final catalyst weight, is in the range of 0.3% to 10%.

5. A catalyst according to claim 1, in which the compact packing density is in the range of 0.35 to 0.80 cm$^3$/g and the total pore volume, determined by mercury porosimetry, is in the range of 0.4 to 1.8 cm$^3$/g.

6. A catalyst according to claim 1, in which the group VIB element is molybdenum and in which the group VIII element is nickel.

7. A catalyst according to claim 1, in which the bead size is 1 to 3 mm.

8. A process for preparing a catalyst according to claim 1, comprising:
    a) treating the active alumina beads in an aqueous medium constituted by a mixture of at least one acid that can dissolve at least a portion of the alumina of the beads and at least one compound which supplies an anion which is capable of combining with aluminum ions in solution, the latter compound being a chemical species which is distinct from said acid;
    b) simultaneously or subsequently, subjecting the treated beads to a treatment at a temperature in the range of 80° C. to 250° C. for a period in the range from a few minutes to 36 hours;
    c) optionally, drying the beads and subjecting them to thermal activation at a temperature in the range 500° C. to 1100° C.;
    d) introducing into the support at least one doping element selected from the group consisting of boron, phosphorus, silicon and elements from group VIIA (halogens), at least one element from group VIB and optionally at least one element from group VIII.

9. A process according to claim 8, in which step d) is carried out by impregnating the selected elements into the support.

10. A process according to claim 9, in which impregnation is followed by the following steps:
    leaving the moist solid in a moist atmosphere at a temperature in the range 10° C. to 80° C.;
    drying the moist solid obtained at a temperature in the range 60° C. to 150° C.;
    optionally, calcining the solid obtained after drying at a temperature in the range 150° C. to 800° C.

11. A process according to claim 8 followed by a catalyst sulfurization treatment.

12. A process comprising catalytically converting metal-containing hydrocarbon feeds, comprising subjecting said feeds to conversion conditions in the presence of a catalyst according to claim 1.

13. A process according to claim 12 comprising converting feeds which are atmospheric residues, straight run vacuum residues, deasphalted oils, residues from coking conversion, from fixed bed hydroconversion, from ebullated bed hydroconversion or from moving bed hydroconversion processes, used as is or diluted with a hydrocarbon fraction or a mixture of hydrocarbon fractions.

14. A process according to claim 12 comprising converting feeds in the presence of coal.

15. A process according to claim 12 comprising fixed bed hydroconversion and/or hydrotreatment.

16. A process according to claim 12 comprising ebullated bed hydroconversion and/or hydrotreatment.

17. A process for fixed bed or ebullated bed hydroconversion and/or hydrotreatment of metal-containing hydrocarbon feeds, comprising subjecting said feeds to hydroconversion and/or hydrotreatment conditions in the presence of a catalyst according to claim 1.

18. A catalyst according to claim 6, wherein the molybdenum has a density of about 3.8.

* * * * *